Nov. 1, 1966 W. W. PENDLETON ETAL 3,282,660
HIGH-TEMPERATURE ELECTRICAL CONDUCTOR AND METHOD OF MAKING
Filed March 26, 1964

INVENTORS
WESLEY W. PENDLETON
RICHARD D. CORNELL
HARRY L. SAUMS

BY *V F Volk*

THEIR AGENT

United States Patent Office 3,282,660
Patented Nov. 1, 1966

3,282,660
HIGH-TEMPERATURE ELECTRICAL CONDUCTOR AND METHOD OF MAKING
Wesley W. Pendleton and Richard D. Cornell, Muskegon, Mich., and Harry L. Saums, Seal Beach, Calif., assignors to Anaconda Wire and Cable Company, a corporation of Delaware
Filed Mar. 26, 1964, Ser. No. 354,885
4 Claims. (Cl. 29—193)

Our invention relates to electrical conductors suitable for service at high temperatures and particularly to such conductors protected from oxidation by an outermost layer of nickel or nickel-bearing alloy.

Modern high-temperature electrical wire insulations, such as those employing fused glass or ceramic coatings, have so increased the temperature ratings of electrical apparatus that, whereas the maximum temperature of operation was formerly limited by the wire insulation, it has now become limited, rather, by the oxidation of the copper conductors at high temperatures. It is known, for example, to provide wire insulations that will maintain their dielectric properties for long periods at 500° C., but at this temperature the oxidation of copper is extremely rapid. Oxygen diffuses slowly through insulating walls that are perfectly sound, electrically, and, at high temperatures, oxygen is supplied to the copper by the inorganic oxides that make up the insulation walls.

Nickel and nickel-bearing alloys such, for example, as stainless steel are known to resist oxidation at elevated temperatures, but nickel shows solid state diffusion with copper at these temperatures. The nickel-copper alloy thus formed has a much lower electrical conductivity than pure copper with the result that the overall conductivity of copper wires protected by nickel or nickel alloys has been reduced by an unacceptable amount. We have discovered, however, that if a layer of iron is interposed directly between the nickel and the copper the conductivity losses over long periods at 500° C. are negligible and that coils can be operated even at 650° or 700° C. with tolerable decreases in conductivity. This discovery is surprising in view of the known alloyability of iron with both nickel and copper at higher temperatures.

Our preferred method of making high conductivity wire with iron and nickel cladding is to sheath a length of copper rod with a close-fitting iron sleeve which is, in turn, fitted into a sleeve of nickel. The composite rod, so formed, is then drawn by known methods to form the oxidation resistant conductor. We have successfully made wire as small as #35 A.W.G. by this method. When stainless steel is used instead of nickel we have succeeded in making wire as small as #30 A.W.G. The difference in sizes is due to the lesser ductility of stainless steel and in this regard it should be noted that the utility of our method is enhanced by the great ductility of both iron and nickel in a commercially pure condition. In the case of iron we have found that the grade known as ingot iron grade is very satisfactory and pure nickel suitable for making the nickel sleeves is readily available.

To achieve satisfactory composite wire, cleanliness is, of course, essential and there can be no foreign occlusions under the sleeves. However, no extraordinary precautions are needed beyond the known methods of freeing the surfaces from oxides and oils. With regard to the relative thicknesses of the core and claddings, we have found that when the cross-sectional area of the composite is made up of about 75% copper core, 12.5% iron and 12.5% nickel, a very satisfactory wire results down to about size 32. Heavier claddings are desirable for drawing to finer sizes.

Although we have preferred to apply the claddings as separate sleeves, it is within the scope of our invention to include wire where the claddings are applied by other methods such, for example, as strip wrapping, electrolytic plating, powder metallurgy, or spray coating.

A more thorough understanding of our invention can be gained from a study of the appended drawing.

Figure 1:
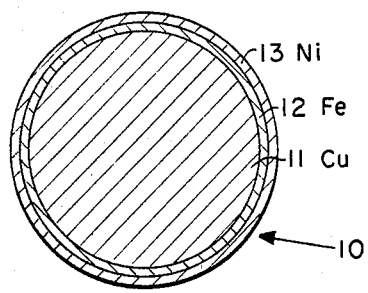
FIGURE 1 represents a section of a wire made in accordance with our invention.

Referring to FIGURE 1, a wire indicated generally by the numeral 10 is comprised of a copper core 11 surrounded by a covering 12 of iron and an outer covering 13 of nickel. Although electrically pure copper is usually employed for the core 11, oxygen free, high-conductivity copper OFHC may be used and our invention will have application, also, to copper alloys including alloys made by powder metallurgy methods. As used in our application, therefore, copper core refers to any core having a copper content, the electrical conductivity of which would be reduced by direct contact with a nickel sleeve at high temperatures.

Figure 2:
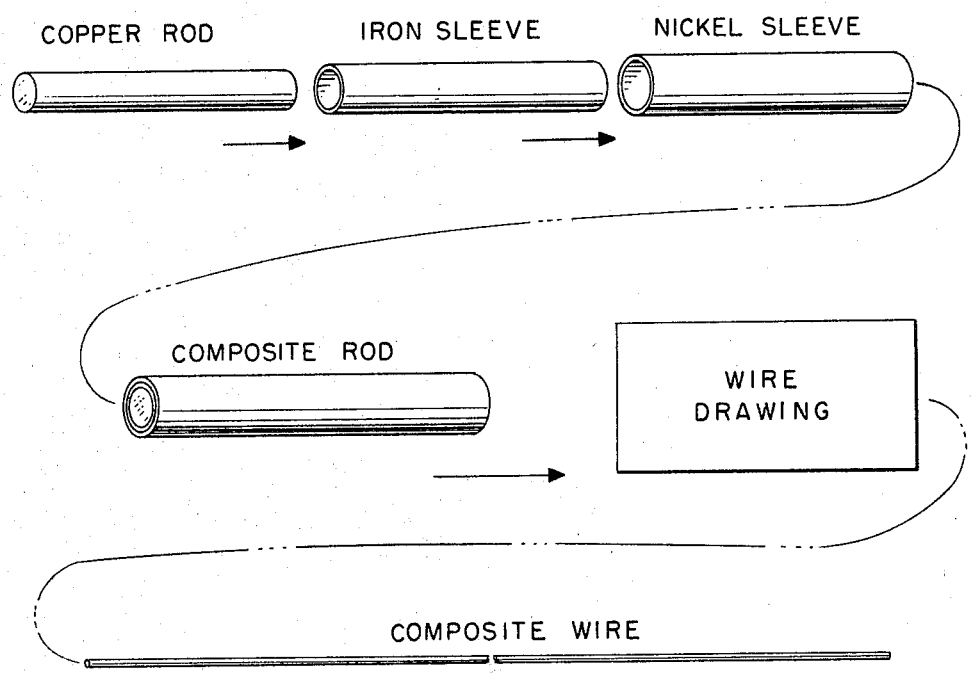
FIGURE 2 shows, schematically, the steps of a method of our invention.

Referring to FIGURE 2, we have shown a diagrammatic representation of a preferred method of making our composite wire wherein a copper rod is covered with close-fitting iron and nickel sleeves to form a composite rod which is then reduced by known wire drawing means to the desired wire size.

*Example*

High temperature wires, sizes 18 and 30 A.W.G., were made by drawing down a copper rod sheathed with sleeves of iron and nickel in the area proportions 75–12.5–12.5. The wire was aged at high temperatures in air with the results shown in the table.

TABLE

| Wire Size A.W.G. | Aging Temp., °C. | Aging Time, Hours | Percent Change in Resistance |
|---|---|---|---|
| 18 | 500 | 600 | 4.0 decrease. |
| 30 | 500 | 600 | 2.0 increase. |
| 18 | 600 | 91 | Not appreciable. |
| 18 | 700 | 91 | Do. |

The table shows how well the conductor of our invention is able to resist both oxidation and solid state diffusion of nickel at very high temperatures. This may be compared to a 35% increase in resistance in 600 hours at 500° C. of a #30 A.W.G. copper wire sheathed in nickel without the iron layer. The decrease in resistance exhibited by the first specimen in the table may be attributed to the effects of a long anneal.

We have invented a new and useful article and method for which we desire an award of Letters Patent.

We claim:

1. A wire having high electrical conductivity comprising a copper core, a barrier layer of commercially pure iron directly covering said core, and an outermost metal layer consisting of nickel, directly covering said layer of iron.

2. A wire having high electrical conductivity comprising a copper core, a barrier layer of commercially pure iron directly covering said core, and an outermost metal layer consisting of nickel-bearing alloy, directly covering said layer of iron.

3. The method of making a high-temperature electrical conductor by cold drawing down to 18 A.W.G. or finer a composite metal rod comprising a copper core fitted directly into a commercially pure iron sleeve, and an outermost nickel sleeve fitted directly over said iron sleeve.

4. The method of making a high-temperature electrical conductor by cold drawing down to 18 A.W.G. or finer a composite metal rod comprising a copper core fitted directly into a commercially pure iron sleeve, and an outermost nickel-bearing alloy sleeve fitted directly over said iron sleeve.

References Cited by the Examiner

UNITED STATES PATENTS

| | | | |
|---|---|---|---|
| 1,078,906 | 11/1913 | Eldred | 29—473.5 |
| 2,301,320 | 10/1942 | Phillips | 29—195 |
| 2,371,348 | 3/1945 | Murray | 29—473.5 |
| 3,212,865 | 10/1965 | Miller | 29—196.3 |

HYLAND BIZOT, *Primary Examiner.*